United States Patent [19]

Shepherd

[11] 3,774,700

[45] Nov. 27, 1973

[54] THRUST BEARING FOR IMPACT TOOL AND OTHER ROCK PENETRATING TOOLS

[75] Inventor: William L. Shepherd, West University Place, Tex.

[73] Assignee: Hughes Tool Company, Houstin, Tex.

[22] Filed: Mar. 8, 1971

[21] Appl. No.: 121,659

[52] U.S. Cl.................. 173/119, 173/123, 173/171
[51] Int. Cl............................................. B25d 1/00
[58] Field of Search............... 173/73, 74, 119–121, 173/122–124

[56] References Cited
UNITED STATES PATENTS

| | | | |
|---|---|---|---|
| 1,704,053 | 3/1929 | Miller | 173/74 |
| 1,932,259 | 10/1933 | Warren | 173/123 |
| 2,869,374 | 1/1959 | Morris | 173/123 |
| 2,974,535 | 3/1961 | Morris | 173/123 |
| 3,000,225 | 9/1961 | Taylor | 173/123 |
| 3,448,817 | 6/1969 | Morishita et al. | 173/123 |

*Primary Examiner*—James A. Leppink
*Attorney*—Roy H. Smith, Jr.

[57] ABSTRACT

There are three principal areas within a main housing to be lubricated, each area involving some part of a power shaft which may be considered to be vertically oriented. The first of these areas (or volumes) is a thrust bearing at the upper end of the shaft, where it has an integral radially outjutting flange supported in a shoulder formed by the main housing. The second area is a radial bearing between the cylindrical surface of the shaft and a confronting bore in a reentrant sleeve portion of the housing which extends down into its interior. The shaft extends below the housing sleeve and terminates inside the main housing. An axially reciprocating subhousing is secured to the lower end of the shaft in sealing fashion, this subhousing being a combination cam-and-striker member with the cam surface lying inside the subhousing and engaging a pair of rollers or cam followers secured to the opposed ends of a short shaft extending transversely through the lower end of the power shaft and projecting at both ends to support the rollers. The third area is the space within the subhousing, which is filled with lubricant to protect the parts of the camming mechanism.

To accomplish the needed lubrication, a main passageway extends from the outside of the main housing to a vent in the bore of the sleeve passageway, where a bearing spacer is provided between a pair of axially spaced radial bearings. This spacer, which is circumferentially floating, has a multiplicity of windows, and also has a groove in its outer surface which permits lubricant to feed the windows. This arrangement also enables lubricant to flow up and down to the two radial bearings. The windows are in flow communication with a short radial passageway in the main shaft which joins an offset axial passageway extending from its juncture with the radial passageway to the bottom of the shaft and thus into the space inside the subhousing member suspended from the lower end of the power shaft. The main passageway through the outer or main housing contains a check valve for injecting lubricant, and this main passageway has a branching passageway leading to the first area, containing the thrust bearing.

5 Claims, 2 Drawing Figures

United States Patent [19]
Shepherd
[11] 3,774,700
[45] Nov. 27, 1973
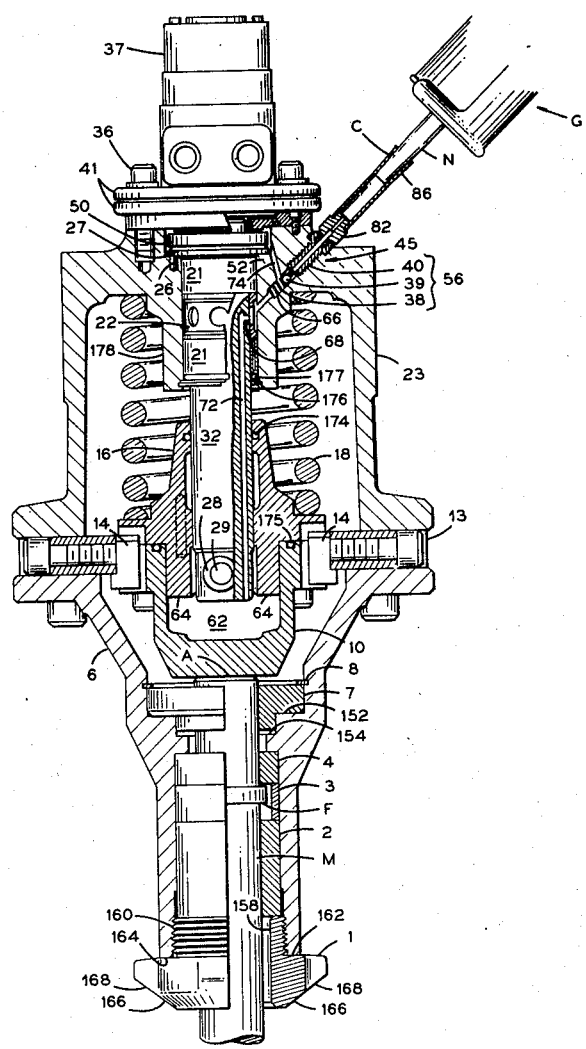

WILLIAM L. SHEPHERD
INVENTOR.

BY Roy H. Smith, Jr.
ATTORNEY

THRUST BEARING FOR IMPACT TOOL AND OTHER ROCK PENETRATING TOOLS

The present invention is concerned with internal lubrication systems in operating machines, more particularly cam and spring operated impact tools. Such tools contain a main power shaft which rotates to roll the cam followers over a cam surface to alternately compress a power spring and let the power spring expand to deliver hammer blows to a working tool.

In such cam and spring impact tools there are three areas along the shaft that require lubrication. One of these is a thrust bearing adjacent the top of the shaft, where a shaft flange is supported on a shoulder at the top of a reentrant sleeve forming an integral part of the housing and extending axially down into its hollow interior. A second area to be lubricated lies between the bore of this sleeve and the outer cylindrical periphery of the main shaft, where a radial bearing is provided for transverse loads. The third area is at the lower end of the power shaft, which terminates inside the main housing and has extending through its lower portion a transverse shaft with a pair of diametrically opposed projections on which are mounted a pair of rollers or cam followers. A hollow subhousing is formed around these rollers and the lower portion of the main shaft, such subhousing being a combination of striker below the shaft and cam member above the shaft. Striker and cam are sealingly secured together, and the upper portion of the cam necks down to form a bore which surrounds the main shaft and forms a sealing, sliding contact with it. It is desirable that the entire volume inside this subhousing be filled with lubricant to protect the cam surfaces, the cam rollers and the transverse shaft which supports the cam rollers.

The lubrication heretofore provided for such assembly has not been satisfactory, and has been quite inconvenient for the user. All three areas were packed with grease at the time of assembly, but initially no means for adding lubricant was provided. It was necessary to disassemble virtually the entire tool in order to add lubricant, and if the user waited too long he sometimes burned out one or more bearings. The bearing areas requiring lubrication were not interconnected in any way, so three distinct operations were required in a complete lubricating job. Later changes made it possible to accomplish some of the lubrication without complete disassembly, but lubrication of the cam and striker subhousing proved cumbersome and time-consuming, requiring as it did the alignment of a hole in the subhousing with a hole in the main housing.

It is the principal object of the present invention to provide a unitary lubrication system for such cam-and-striker impact tools, one in which lubricant may be added through the main housing wall and distributed to all areas requiring lubrication. A further object is to provide a series of interconnected lubricant flow channels so that lubricant added at a central point may flow through such channels to reach all of the lubricated areas of the assembly. Another object is to provide such interconnected lubricant flow channels utilizing as much as possible the previously existing structure, whether elements of that structure are fixed in position or move in various ways during operation of the tool. A further object is to provide a bearing spacer disposed between radial bearing elements to serve two purposes, assisting in determining the position of such radial bearing elements and assisting in the distribution of lubrication to the areas requiring lubrication.

The desired objects are attained according to the present invention by first providing a main lubricant passageway extending from the outside of the main housing to a point in the bore of the reentrant housing sleeve about midway between its ends. Where this main passageway intersects the bore of the sleeve, there is provided a bearing spacer or lubricant distributor in the general form of a spool containing a multiplicity of openings through the thin cylindrical wall of the member. These windows is in flow communication with an opening into the main power shaft, a short blind radial opening which joins with a blind axial opening in the shaft which extends all the way to the bottom, where it vents into the hollow interior of the subhousing made up of the combination cam and striker. The main passageway is provided with a check valve for the injection of lubricant, and the passageways already described are actually sufficient to insure that lubricant will be passed down to the cam-and-striker end of the main shaft, into the radial bearings above and below the bearing spacer, and into the thrust bearing area at the top of the power shaft. However, to insure that there will be adequate lubricant in the thrust bearing area, a branch passageway from the main lubricant passageway leads directly to the portion of the housing wall where such bearing is located.

The reader will undoubtedly get a quicker grasp of the present invention by referring to the attached drawing while reading the following detailed description. In the drawing.

Figures 1, 2:
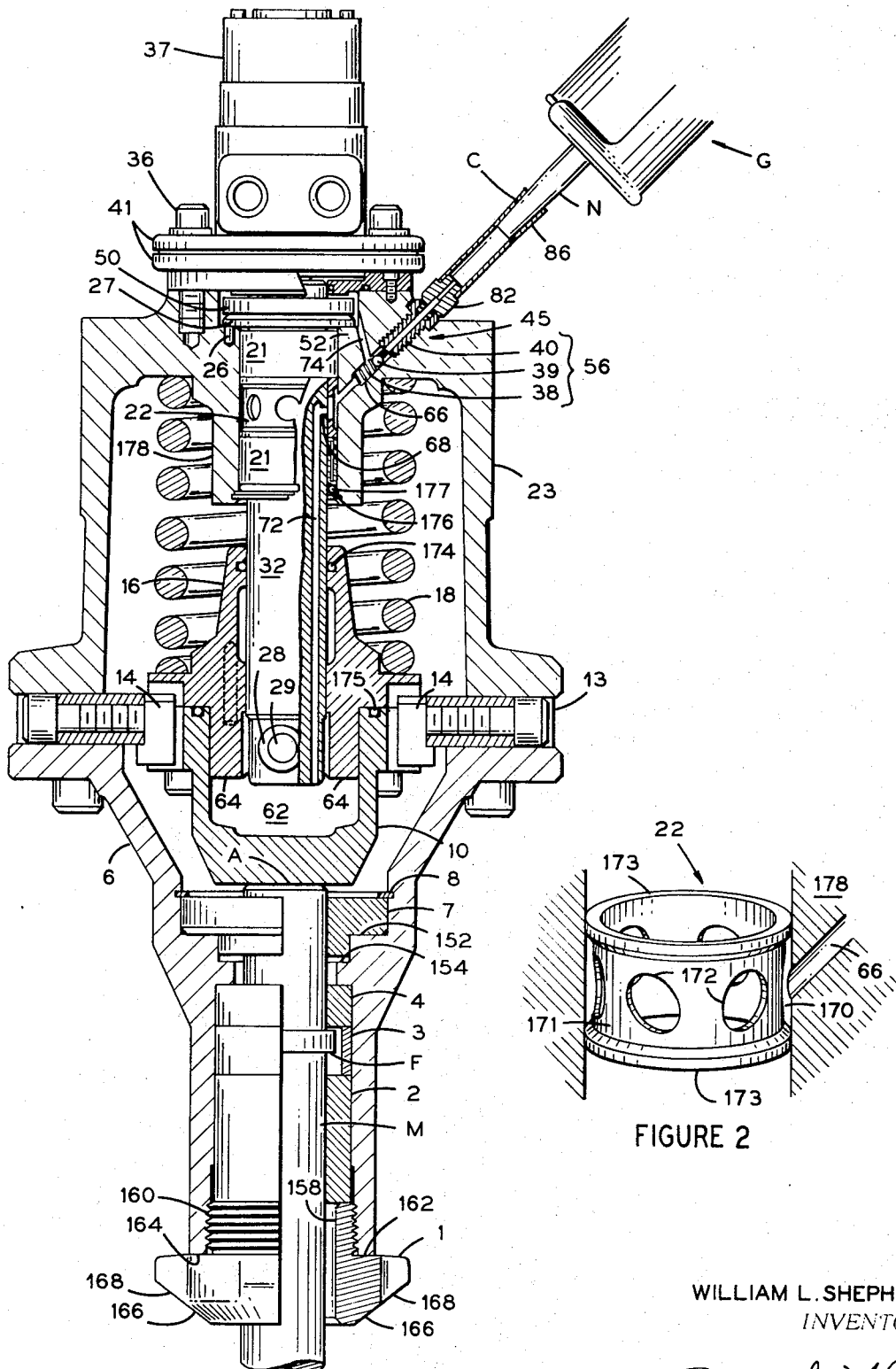
FIG. 1 is an overall view of a complete impact tool utilizing the present invention, partly in elevation and partly in longitudinal section.
FIG. 2 is a perspective view of the bearing spacer of the assembly as isolated except for the addition of sections of the bearing sleeve with which it cooperates to illustrate certain points.

FIG. 1 shows a preferred embodiment of the invention in a cam-and-spring operated impact tool contained in an upper housing 23 and a lower housing 6 joined together by the indicated bolts to sandwich between them a striker guide ring 13. The lower end of the housing is open to accommodate a moil or working tool M which extends up through a retainer 1, tool guide sleeve set 2, tool guide ring 3, tool guide bushing 4, and an anvil 7 held in place by snap ring 8, the moil M terminating in an anvil surface A which receives the blows from the downwardly descending striker 10 during power strokes of the latter. Striker 10 is securely and sealingly bolted to cam member 16 to reciprocate axially therewith as a single unit, and together they constitute a subhousing containing a hollow interior 62. Into this space 62 there extends a shaft extension 32, which is a projection of the shaft of hydraulic motor 37 mounted on the top of the housing by machine screws 36 and the pair of cushion plates 41. Power spring 18 surrounds the shaft extension 32 and is compressed between the indicated annular surfaces of cam 16 and upper housing 23. A transport shaft 29 is disposed in a transverse opening through the lower end of shaft extension 32 so that it protrudes somewhat at the diametrically opposed ends of the transverse hole, and on each protruding end of the transverse shaft there is mounted a cam roller or follower 28. In operation these cam followers roll on the cam surface 64 to alternately force the cam striker combination (subhousing) 10–16 upwardly to compress spring 18 during the compression stroke and disengage from the cam surface to permit power spring 18 to expand and accelerate the combination 10–16 downwardly to deliver an impact blow to anvil surface A of working tool M. The pair of diametrically opposed guide blocks 14 are disposed in registry with a pair of axial grooves on the outside of striker 10 to determine the path of the reciprocating member. A more complete description of this feature, as well as the overall construction and operation of the tool is set forth in U.S. Pat. Nos. 3,186,498 and 3,513,918.

The lubrication system includes the main passageway 66, a stepped opening accommodating the ball-and-spring check valve 56 and adapted for use with either a grease gun or the special lubricant injection system illustrated. This injection system is more fully disclosed and claimed in a separate application, and for the present purpose it is sufficient to observe that the lubricant injection tip 45 has a distal end in the form of a narrow conduit which passes through the opening and orifice in valve body 40 to contact ball 39 of the valve and lift it from its seat, thereby accomplishing a mechanical valve opening rather than one relying on lubricant pressure. The injector tip 45 is flow connected through conical tip C of a special grease gun G which operates in the manner of a caulking gun, i.e., by steadily pushing on the entire load of lubricant within the gun to obtain a high volume, low pressure flow.

As seen better in the enlarged isometric view of the bearing spacer-lubricant distributor 22 in FIG. 2, main lubricant passageway 66 vents into the bore of reentrant housing sleeve 178 between the axial ends of spacer 22. This spacer is fitted loosely between such bore and the outer periphery of shaft extension 32, so that it may be readily moved axially in assembly and disassembly operations, and also to enable it to float circumferentially.

The loose fit may be obtained, for example, by making the inside diameter of spacer 22 larger than the diameter of shaft 32. Bearing spacer — lubricant distributor 22 may be thought of as a sleeve or spool which was originally a simple cylindrical shell thereafter grooved at 170 to leave a pair of axially spaced end rings 173 joined by a dished wall 171. Through this wall there extends a multiplicity of circumferentially spaced openings 172 for the passage of lubricant. Lubricant fills the groove 170 and passes through openings 172, some of it oozing past the end rings 173 to feed both the lower needle radial bearing 21 and the upper radial needle bearing 21. Lubricant also rises through the upper radial bearing into the space accommodating thrust ring 27 and flange 50 of the shaft extension 32. The two radial bearings 21 and bearing spacer 22 are held in the open ended sleeve 178 by a snap ring 176 received in the indicated groove in the bore of sleeve 178, and leakage of lubricant along the shaft is avoided by an O-ring seal 177 radially compressed between the outer periphery of the shaft and the bore of the sleeve, and also compressed somewhat between snap ring 176 and the lower annular surface of lower needle bearing 21.

Before returning to the bearing spacer, it should be noted that an auxiliary lubricant passageway 74 is provided between the main passageway 66 and the counterbore in the top of housing 23 which supports and accommodates flange 50 of the shaft extension and the thrust ring 27. Such auxiliary passageway is not essential, but is added to insure that lubricant in adequate quantities reaches this important area.

The holes or windows 172 in wall 171 of the bearing spacer or lubricant distributor are flow connected with a short blind radial opening 68 formed in shaft extension 32. Such passage is, in turn, flow connected to the long offset axial passage 72 also formed in the shaft extension, this passageway 72 extending all the way to the bottom of the shaft extension and venting in flow communication with the hollow interior 62 of the cam and striker subhousing 10–16. Thus, lubricant is provided for all parts of the system requiring lubrication, and all may have lubricant added through the common injection system in main lubricant passageway 66. It should be noted that seals 174 and 175 have been added to the cam and striker subhousing to prevent leakage from this combination member, and that seals are similarly provided to prevent lubricant leakage from the bottom of the radial bearings and from the enclosure for the thrust bearing. However, no seal has been provided to isolate the thrust bearing from the radial bearings, as they are adjacent to one another and it is desirable to have lubricant shared between these two types of bearings.

What is claimed is:

1. In a motor driven, cam-and-spring operated impact tool which includes a housing, a shaft extending through a bore into the housing from a motor mounted atop such housing and a cam member surrounding the free end of the shaft and cooperating therewith by contact between a pair of cam followers mounted on a shaft projecting transversely at opposed diametral ends of the motor shaft and an annular camming surface on the cam, there being a subhousing within the main housing which includes said cam member enclosing said camming surface, transverse shaft and lower end of the motor shaft, the improvement comprising a lubrication system for said subhousing interior comprising an opening through the main housing wall for injecting lubricant and a passage extending axially through said shaft, said passage being connected at its upper end to the space contiguous with the inner end of said housing wall opening and terminating at its lower end in the space within said subhousing.

2. The improved impact tool of claim 1 which the upper end of said axially extending passage in the shaft includes a portion extending radially to the lateral surface of the shaft and breaching the same at a vent, together with a sleeve-like bearing spacer or lubricant distributor member surrounding the shaft, said bearing spacer being disposed in an annular space between the outer surface of the shaft and the inner wall of said bore and having a multiplicity of circumferentially spaced radial windows therethrough, said windows approximately registering axially with said vent in the shaft and the inner end of said housing wall opening.

3. In a motor driven, cam-and-spring operated impact tool which includes a housing, a shaft extending into the housing from a motor mounted atop such housing, an outwardly radially projecting flange on said shaft adjacent the motor end of the housing and a cam member surrounding the free end of the shaft and cooperating therewith by contact between a pair of cam followers mounted on a shaft projecting transversely at opposed diametral ends of the motor shaft and an annular camming surface on the cam, there being an annular surface on the interior of the housing wall facing an annular surface on said flange to form a friction bearing therewith, and there being a subhousing within the main housing which includes said cam member enclosing said camming surface, transverse shaft and lower end of the motor shaft, the improvement comprising a lubrication system for said subhousing interior and said friction bearing comprising an opening through the main housing wall for injecting lubricant and a passage extending axially through said shaft, said passage being connected at its upper end to the space contiguous with the inner end of said housing wall opening and terminating at its lower end in the space within said subhousing, and a branch opening through said main housing wall terminating at one end in said opening and at the other end in said friction bearing.

4. A bearing spacer-lubricant distributor for use in a motor driven, cam-and-spring operated impact tool, said impact tool including a main housing, a shaft extending from a motor through a bore into the main housing and into a subhousing within the main housing, said subhousing and shaft including cooperating cam and cam follower means enclosed by said subhousing; said bearing spacer-lubricant distributor to be located:
  a. loosely between the inner wall of said bore and the outer periphery of said shaft,
  b. between two bearing members to be located in said bore and around said shaft, and
  c. between a lubricant receiving opening formed through the main housing wall and a passageway extending into and axially through said shaft to said subhousing, said bearing spacer-lubricant distributor being in the form of a spool or sleeve having a wall indented from its outer surface to form an annular groove between its ends and a multiplicity of radial windows extending through said wall from said annular groove, said windows being located between the ends of the sleeve and being circumferentially spaced from one another.

5. In a motor driven, cam-and-spring operated tool which includes a main housing, a shaft extending into the main housing from a motor, coupled to said main housing, and into a subhousing within the main housing, said subhousing and shaft including cooperating cam and cam follower means enclosed by said subhousing, the improvement comprising a lubrication system for said subhousing interior comprising an opening through the main housing wall for injecting lubricant and a passage extending axially through said shaft, said passage being connected at its upper end to the space contiguous with the inner end of said main housing wall opening and terminating at its lower end in the space within said subhousing.

* * * * *

UNITED STATES PATENT OFFICE
CERTIFICATE OF CORRECTION

Patent No. 3,774,700           Dated November 27, 1973

Inventor(s) WILLIAM L. SHEPHERD

It is certified that error appears in the above-identified patent and that said Letters Patent are hereby corrected as shown below:

The title shall be: INTERCONNECTED LUBRICANT SYSTEM FOR IMPACT TOOL

Signed and sealed this 11th day of June 1974.

(SEAL)
Attest:

EDWARD M. FLETCHER, JR.
Attesting Officer

C. MARSHALL DANN
Commissioner of Patents